United States Patent
Erikmats et al.

(10) Patent No.: US 7,538,717 B2
(45) Date of Patent: May 26, 2009

(54) ADAPTIVE GROUND CLUTTER CANCELLATION

(75) Inventors: Osten Erikmats, Mölnlycke (SE); Svenolov Rizell, Gråbo (SE); Per-Arne Kindberg, Mölnlycke (SE); Ake Andersson, Mölndal (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 10/538,044

(22) PCT Filed: Dec. 20, 2002

(86) PCT No.: PCT/SE02/02426

§ 371 (c)(1),
(2), (4) Date: Jun. 8, 2005

(87) PCT Pub. No.: WO2004/077093

PCT Pub. Date: Sep. 10, 2004

(65) Prior Publication Data

US 2006/0109173 A1     May 25, 2006

(51) Int. Cl.
*G01S 13/52*     (2006.01)
*G01S 7/292*     (2006.01)
*G01S 7/28*     (2006.01)
*G01S 13/00*     (2006.01)

(52) U.S. Cl. .......................... 342/159; 342/89; 342/91; 342/175; 342/195

(58) Field of Classification Search ........... 342/89–103, 342/159–164, 175, 194–196, 25 R–25 F, 342/118, 128, 130–145, 165–174
See application file for complete search history.

(56) References Cited

U.S. PATENT DOCUMENTS 3,720,941 A     3/1973 Ares (Continued)

FOREIGN PATENT DOCUMENTS

GB     2 260 234 A     4/1993

OTHER PUBLICATIONS

Y. Wang et al., "Space-time adaptive processing for airborne radar with various array orientations", in IEE Proceedings, Radar, Sonar and Navigation, vol. 144, No. 6, 1997, pp. 330-340.

(Continued)

*Primary Examiner*—Bernarr E Gregory
(74) *Attorney, Agent, or Firm*—Nixon & Vanderhye, P.C.

(57) ABSTRACT

The present invention refers to an airborne radar device (1) comprising at least two antennas (2, 3) and clutter suppressing means (4). The radar device is arranged, via the antennas (2, 3) to send out radar pulses focused in main lobes (5) and the antennas are arranged to receive reflecting pulses. The antennas (2, 3) are separated from each other vertically. The radar device (1) comprises means (6) for transforming the received radar pulses into complex video signals in the form sequences of range bins ($R_k$). The video signals are represented in a first channel ($K_1$) and a second channel ($K_2$).

15 Claims, 8 Drawing Sheets

U.S. PATENT DOCUMENTS

| | | | |
|---|---|---|---|
| 3,727,220 A | * | 4/1973 | Brennan et al. ............... 342/89 |
| 3,993,994 A | * | 11/1976 | Goggins ..................... 342/194 |
| 3,995,271 A | * | 11/1976 | Goggins, Jr. ................. 342/91 |
| 4,719,466 A | * | 1/1988 | Farina et al. ................ 342/159 |
| 4,742,353 A | * | 5/1988 | D'Addio et al. ............ 342/159 |
| 5,559,516 A | | 9/1996 | Didomizio et al. |
| 5,630,154 A | * | 5/1997 | Bolstad et al. ............. 342/159 |
| 5,703,593 A | | 12/1997 | Campbell et al. |
| 6,650,271 B1 | * | 11/2003 | Simone et al. ............. 342/159 |
| 6,809,681 B1 | * | 10/2004 | Niechayev ................. 342/159 |

OTHER PUBLICATIONS

J. Ward et al., "Adaptive processing for airborne surveillance radar", 1996 Conference Record on the Thirtieth Asilomar Conference on Signals, Systems and Computers, 1996, vol. 1, pp. 566-571.

EP Communication Pursuant to Article 96(2) EPC mailed Sep. 28, 2007 in corresponding EP application 02808358.2

* cited by examiner

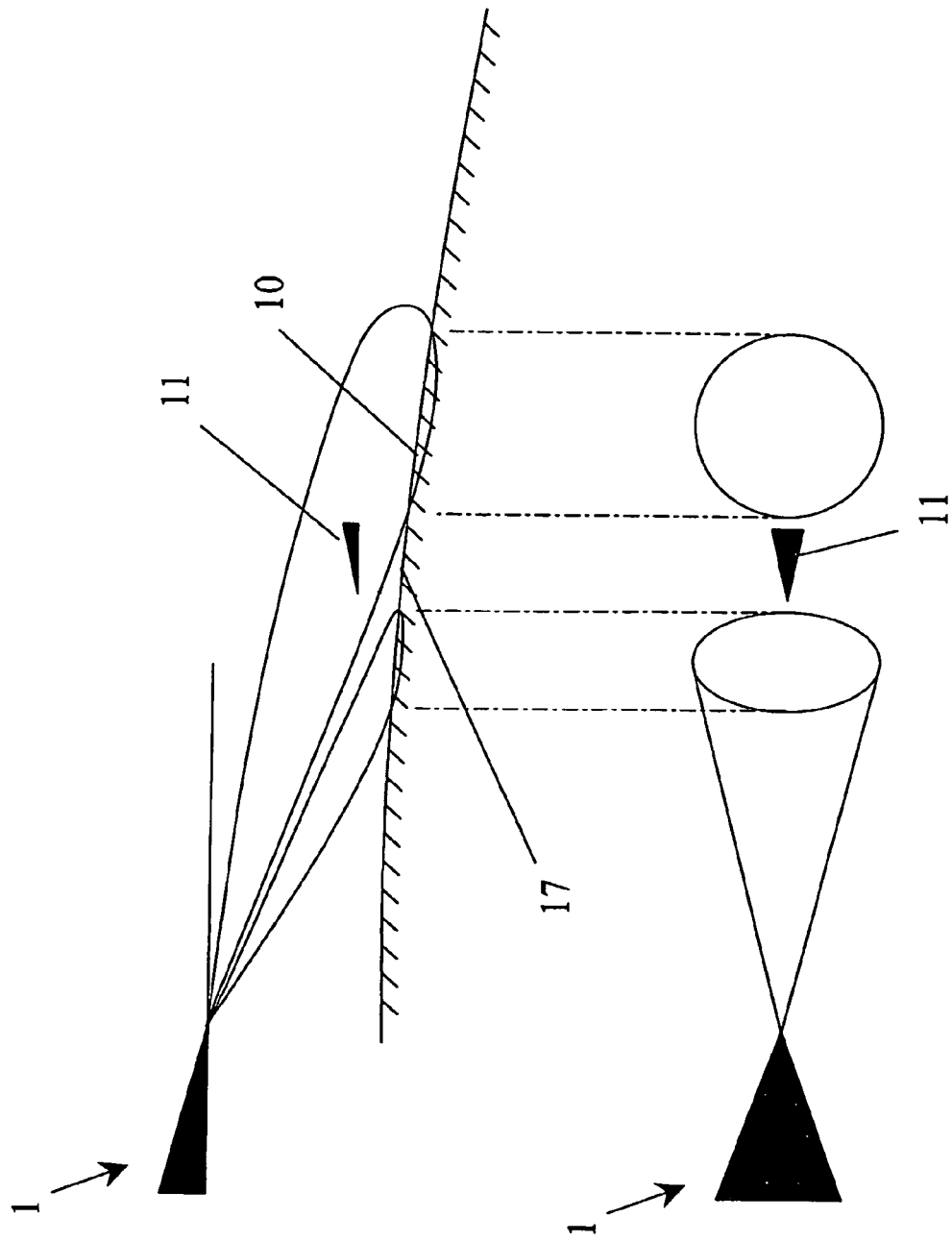

ADAPTIVE GROUND CLUTTER CANCELLATION

This application is the US national phase of international application PCT/SE2002/002426 filed 20 Dec. 2002, which designated the U.S., the entire content of which is hereby incorporated by reference.

TECHNICAL FIELD

The present invention relates to an airborne radar device comprising at least two antennas and clutter-suppressing means for suppressing ground clutter. The radar device is arranged to send out radar pulses focused in main lobes via the antennas. The antennas are arranged to receive reflected radar pulses. The antennas are separated from each other vertically. The radar device comprises means for transforming the received radar pulses into complex video signals in the form of sequences of digital samples, so-called bins, which represent radar-reflecting objects at different distances within the antenna lobes.

RELATED ART AND OTHER CONSIDERATIONS

To detect objects, targets, of different types, for example aircraft, boats, cars, or to determine the topography of a certain area of land, it is known to use radar. A radar transmits and receives electromagnetic pulses within a solid angle which is determined by the design of the radar antenna system. A radar antenna is preferably designed to collect the emitted electromagnetic energy within a main lobe which must be as narrow as possible, the larger the antenna surface the narrower the main lobe. The horizontal lobe width becomes less with increasing extent in the horizontal direction of the antenna. This correspondingly applies to the vertical lobe width.

By being suitably constructed, the radar antenna can thus concentrate and transmit or receive signals within a small solid angle, which is called the main lobe or sometimes simply the lobe. The main lobe covers a sector with a certain lobe width in the horizontal and vertical direction. Due to its construction, the radar antenna can have a bigger lobe width in the horizontal direction than in the vertical direction and vice versa. Different lobe widths can occur but the width is preferably only one or a few degrees. The larger the antenna the better the directional indication obtained for the target through a narrower main lobe. Better sensitivity is also obtained through increased antenna gain. The main lobe direction is changed through mechanical turning of the antenna or through electrical phase control of the radiating elements in an electrically controlled antenna ESA (Electrically Scanned Antenna).

The range of sensitivity of the radar in the radial direction is determined by among other things the energy of the received reflected pulse which, in turn, is proportional to the emitted pulse energy. The higher the pulse energy, the greater is the range in the radial direction which can be covered. At different distances and for a given reflection surface of the target, the received pulse energy is changed as the inverse of the distance to the fourth power. The received energy decreases with increasing target distance to be masked by the thermal noise of the receiver at the limit of the receiver sensitivity of the system. The range of sensitivity is frequently called distance coverage. In the angular direction, the coverage is determined by the lobe width according to the above.

When the electromagnetic pulses hit an object, it is said that the object is illuminated by the radar pulses. When the object is illuminated, the electromagnetic pulses are normally reflected in several directions depending on the shape of the object. A fraction of the pulse energy is reflected back towards the radar and is received via the receiver antennas which forwards the respective received signals to the respective receivers. The receivers include means for converting the radio frequency analogue signals into sampled video signals. The analogue output signal is normally divided into two components designated I and Q. The component I stands for "in-phase" and the designation Q stands for "quadrature phase" and is treated like a time sequence of complex numbers I+jQ.

The sampling frequency is approximately as high as the bandwidth B of the radar pulse. To achieve a time resolution $\Delta t=1/B$, a number of parameters are used. After a signal-adapted filtering in the radar receiver, a radar pulse with short time duration or alternatively a radar pulse with longer time duration and suitable modulation to produce the bandwidth B can be used for achieving the time resolution $\Delta t=1/B$. The time resolution $\Delta t=1/B$ corresponds to a distance resolution $\Delta R=\Delta tc/2$, where c is the speed of light. The sampling frequency is high enough to guarantee that all radar echoes will be sampled after the signal-adapted filter. A sample t seconds after the emission of the radar pulse contains the radar echo from a target at the distance $R=tc/2$ and within a lesser distance range of $\Delta R=\Delta tc/2=c/(2B)$. This distance range goes by the name range bin or simply bin. The sampling time is synchronized with the pulse emission with the aid of a clock.

In different radar systems, different sets of antennas are used. In a bistatic radar, the antennas are separated whereas in a monostatic radar, they are collocated. A monostatic radar is the normal construction in moving radar systems. Most commonly, the same antenna system is used for both transmitting and receiving. In certain systems, several part-antennas are also used for receiving; this being the case in the present description of the invention.

In the case of a moving unit which comprises a radar device, the receiver antenna is expediently placed next to or in the vicinity of the antenna which sent the pulses, for practical reasons for one thing, when the radar unit e.g. is airborne. The reason for this is that the mutual distance between the antenna which sent the pulses and the antenna which received the reflected pulses is known independently of the arrangement of movement of the moving unit.

If radar is used for finding or following certain specific targets in specific environments/surroundings, it is known to use a number of different techniques depending on what target one is looking for. This is due to the fact that different surfaces reflect in different ways. Moreover, certain conditions must be taken into consideration if it is attempted to detect targets on the ground, other conditions if it is attempted to detect targets at sea and yet other conditions if it attempted to detect targets in the air. It is also decisive if it is attempted to detect moving targets or stationary targets.

All cases where radar is used have in common that the receiver produces thermal noise which tends to mask weak received signals. Thermal noise is suppressed in known ways by matched filtering. Further suppression and thus increased range coverage is obtained by increased pulse energy as above and also by suitably combining several pulse responses with repeated transmission bin by bin.

Other undesirable information is so-called clutter, which is unwanted radar reflections. Such clutter can be surface clutter in the form of unwanted ground reflections, so-called ground clutter, or in the form of unwanted reflections at sea, so-called sea clutter. Clutter can also consist of volume clutter due to rain, or of point clutter from large structures such as, e.g. steel bridges. Regardless of the type of clutter which is being considered, it is always desirable to suppress clutter and noise so that the reflections from the sought-after object can be distinguished more easily from clutter and noise. Depending on the type of clutter which is referred to and depending on which type of target is referred to, a plurality of known techniques for suppressing clutter is applied.

A target mostly has less reflection surface than the background, e.g. the ground, which is why clutter signals contain more energy than the reflected pulses from the target. If too little energy is left in the received pulses, it can, therefore, be difficult or impossible to distinguish target from noise and clutter.

When the intention is to detect moving targets which are located in contrast against the ground, e.g. cars or aircraft, it is known to use various different techniques. For example, DPCA (Displaced Phase Centre Antenna) can be mentioned, which is a method for suppressing ground clutter in airborne radar. For DPCA, two antennas are used in the horizontal plane and at least two pulses. By selecting the PRF, i.e. pulse repetition frequency, in a suitable way in relation to the distance between the antennas and the speed of the unit which carries the radar device, it is possible to compensate for one's own speed, which ideally results in a ground clutter without the spectral widening, which otherwise occurs due to the movement of the radar relative to the reflecting ground.

A problem with DPCA is that the radar device is limited to horizontally mounted antennas. Another problem with DPCA is that it requires at least two coherent pulses at the same radio frequency. To be tied to at least two coherent pulses implies, among other things, that the system becomes somewhat delayed since the system constantly has to wait for the next pulse to be able to carry out clutter suppression. Moreover, PRF must be matched precisely to the current speed of the unit which carries the radar device, something which is difficult to carry out and which, when it fails, results in deterioration in performance.

Another example is STAP (Space-Time Adaptive Processing), which is a method for clutter suppression for airborne radar and especially for AEW (Airborne Early Warning) radar. STAP utilizes both space and time correlations in the clutter to suppress ground clutter via a two-dimensional filter for space and time. STAP can thus be seen as a generalized DPCA with the above-mentioned problems.

In U.S. Pat. No. 5,559,516, an airborne moving radar device for detection and measurements of angles of slow targets in the main lobe through suppression of clutter is shown. The device comprises three radar antennas (left, centre, right) for receiving a radar signal, the antennas preferably being placed beside one another, i.e. in the horizontal direction. The three antennas cooperate in forming a main lobe when there is pulse alteration. Each antenna is coupled to a receiver arrangement for converting an analogue signal into a digital signal. The receiver arrangements are coupled to a signal processing arrangement which converts the signals into a video signal. The signal processing arrangement also comprises means as described above for dividing the signals into I and Q components.

The signal processing arrangement comprises a clock arrangement which controls the time of emission of pulses and the times of receiving the reflected pulses at the three receiver antennas. The arrangement makes use of the familiar Doppler effect, i.e. the frequency shift of the received signal which primarily manifests itself as a systematic, linearly increasing additional phase displacement for each new pulse in the sequence of radar pulses. Since the radar device is moving with respect to both the ground and any targets, the Doppler shift is produced due to the movement of the radar device relative to the reflecting objects. The latter Doppler phenomenon is suppressed at the three antennas by known techniques for motion compensation.

The signal processing arrangement also comprises means for storing information from the three antennas at different times, which are more closely determined at times which are determined by the pulse repetition frequency. The stored information is used for comparing video signals from the right antenna with video signals from the centre antenna and video signals from the left antenna with video signals from the centre antenna, and further means for the comparison between the resulting difference signals. To suppress ground clutter according to U.S. Pat. No. 5,559,516, the said stored information and said signals are used together with a Fourier analysis in the signal processing arrangement to enable phase corrections for clutter in the frequency domain to be performed.

One problem with a radar device according to U.S. Pat. No. 5,559,516 is that the device depends on a multiplicity of pulse emissions following one another, i.e. on PRF which means that it is based on various time constants and also frequencies for each pulse emission which leads to poor flexibility of the device. U.S. Pat. No. 5,559,516 also provides a radar device for the detection of targets on the ground, which is very different from a radar device intended for the detection of air targets.

All devices and methods for suppressing clutter described above make use of a multiplicity of coherent pulses following one another, with the abovementioned problems. The methods require that the same radio frequency is used for achieving coherence among all the pulses which will be processed together. During the relatively long time period required, countermeasure equipment can calibrate the radio frequency of the radar and emit interference at the current frequency and thus foil the operation of the radar. There is thus a requirement for an improved radar device where clutter is suppressed, preferably independently of coherent pulses and frequencies.

DESCRIPTION OF THE INVENTION

The invention intends to solve the above problems in previously known radar technology for suppressing ground clutter.

The problem is solved with an arrangement and a method which provides an airborne radar device comprising at least two antennas and clutter-suppressing means for suppressing unwanted radar pulse reflections such as ground clutter. The radar device is arranged to send out radar pulses focused in main lobes via the antennas. The two antennas are arranged to receive reflected radar pulses. The antennas are placed with their centres separated in the vertical direction and both with lobes pointing in the same direction as the main lobe. The radar device comprises means for converting the received radar pulses into complex video signals in the form of sequences of digital samples, so-called bins, which represent radar-reflecting objects at different distances in the current lobe direction. The radar device thus comprises means for converting the analogue signals into complex digital video signals in the form of a number of bins which together represent the main lobe. The clutter-suppressing means are arranged to represent the signals in a first channel and in a second channel.

The clutter-suppressing means are arranged to form a weighted sum of the received signals through adaptive digital lobe formation. The weights are thus adapted automatically with the aid of the received signals so that the weighted sum corresponds to a resulting antenna lobe with high suppression of ground clutter from each individual ground element within the antenna lobe. This improves the detection capability for flying targets at the same distance but above the same ground element. In particular, the arrangement makes use of the fact that the weights vary in a systematic way as a function of the distance to the respective reflecting ground element.

The clutter-suppressing means is arranged in such a way that the clutter component $e_c$ for a certain bin $R_k$ in the first channel is also found in the second channel multiplied by a complex constant $C(R_k)$. The complex constant $C(R_k)$ is the quotient between the complex antenna gain of the second channel and of the first channel in the direction of the ground for the current bin $R_k$. According to the invention, the complex constant is automatically adjusted in such a way that the zero position, which is individual for each bin, is directed towards the respective ground segment, thereby suppressing the clutter signal. This will be explained in detail further below.

Since the different antennas are placed above one another, a reflected pulse from the same point on the ground or from the same point on a target will travel a different distance and such a path difference is described in the complex plane mainly by a phase displacement of the video signals, i.e. a phase displacement of the common vector I+jQ and also a certain amplitude effect. The complex constant $C(R_k)$ describes the combined phase and amplitude effect.

The clutter-suppressing means is arranged for estimating a complex constant $\hat{C}(R_k)$ which describes how the signals from the receiver antennas are weighted together separately for each bin $R_k$ so that the clutter component $e_c$ will be suppressed with the formation of a resultant video output signal ($\Psi$). The estimated constant $\hat{C}(R_k)$ is intended to suppress the clutter component $e_c$ in the resultant video output signal $\Psi$ by subtraction of the second channel from the first channel multiplied by the estimated constant $\hat{C}(R_k)$. The clutter-suppressing means is arranged to produce, by suppressing the clutter component, a zero position in the resultant antenna pattern of the resultant video output signal $\Psi$ in the direction of the ground in the current range bin.

The signal $e_f$ from the target is weaker than the signal from the ground, i.e. the clutter component $e_c$, which is why suppression of the clutter component enables the target signal of interest to stand out in an analysis of the reflected pulses from the radar emission.

For each bin $R_k$, the constant $\hat{C}(R_k)$ can be estimated with the aid of surrounding bins, because they vary in a systematic manner as a function of the distance due to the geometry in the current application.

The radar device preferably provides a method and an arrangement for suppressing unwanted radar reflections from ground and sea, so-called ground or sea clutter. The radar system is intended to be arranged on a moving unit such as an aircraft and is intended to preferably detect targets in the air. In contrast to ASLU (Adaptive Side Lobe Suppression), where the suppression is done for a single discrete direction, the method involves the clutter being suppressed for each range bin even though direction varies between different bins. Another advantage is that the method works with a single pulse, i.e. that it is not necessary to have coherence between several different pulses. The fact that the method operates on a single pulse means that clutter can be suppressed with the information provided by the reflections from the single pulse. This differs from what has been previously known, e.g. from U.S. Pat. No. 5,559,516, STAP or DPCA, which have already been described above.

The fact that coherence between pulses is not necessary means e.g. that the frequency is changing from pulse to pulse. Such changing of frequency is particularly useful when illuminating, e.g. an enemy aircraft, since a change in frequency can prevent an enemy aircraft from being able to send out interference signals to prevent radar calibration of the target. Frequency change is also advantageous by reducing the measurement uncertainty for estimating the constant $\hat{C}_k$ which has the same value for different radio frequencies and in time intervals which can include several transmit pulses.

As mentioned above, the technology advantageously works without coherence between the pulses but it must be mentioned that the technology is not limited in this respect but also operates with coherence.

Placing the radar antennas in accordance with the present technology provides the possibility of suppressing clutter in the vertical direction, which is advantageous in the case of air targets. To suppress clutter in the vertical direction is not possible with a radar device with a number of antennas placed in the horizontal direction according to the prior art.

Vertical direction here means a mainly perpendicular direction when the moving radar device is located on the ground. Since the radar unit is intended to be used with flying objects, the antenna may roll with the plane. A maximum rolling angle of the antennas of ±15° relative to the ground plane provides continuous good characteristics, but rolling angles exceeding ±15° can entail a certain impairment of performance with respect to clutter suppression.

To facilitate the understanding of how the sampling is coupled to the ground segments, an imaginary side view can be taken where the radar device in a coordinate system is located on the y axis (corresponding here to the vertical) at a certain distance from the point of origin. The radar device sends a ray (main lobe) diagonally down towards the x axis (corresponding here to the ground plane), which main lobe illuminates a part of the x axis. The sampling of the signal corresponds to a number of ground segments within the main lobe. Seen from the side, these ground segments are located in different directions with different angles from the radar device. The sum of all ground segments makes up the part of the ground which is illuminated by the main lobe. Considering instead the whole process above, each ground segment will consist of "distance rings" limited in the sideways direction by the extent of the main lobe.

Each such ground segment in the main lobe can be described as limited by radial lines of sight which emanate from a common point in the radar device, which common point is common to all radial limiting lines for all segments located in the main lobe. The radial lines of sight thus extend from the radar device to the ground surface and divide up the part of the ground surface which is illuminated by the main lobe in the said ground segment.

The term bin has already been described and relates to the segment limited by the sampling in the main lobe. In the description below, a specific bin is given as $R_k$, where the index k specifies the specific bin k (the kth bin) and R specifies the distance created by the sampled time in the segment in the main lobe in the line of sight. The bin can thus make up the part of the line of sight which is projected on a specific ground segment.

In summary, it can be said that the sampled signal in its discrete time interval can be described as the main lobe being divided up into a number of discrete bits, segments/bins and that each discrete time interval corresponds to a certain ground segment coupled to the bin in that the bin constitutes a projected image of the ground segment.

In the signal processing arrangement, the video signals are processed in different ways. As mentioned above, the signals are sampled signals from the different antennas and contain discrete time intervals which define a bin.

As mentioned earlier, signals received after each emitted pulse can be treated individually, which eliminates the need for a plurality of pulses.

Below, a description of the method according to the technology follows, where $x_1$ is represented in the first channel and where $x_2$ is represented in the second channel.

The signals for range bin $R_k$, and pulse or Doppler channel n, are described as follows $$x_1(R_k,n)=a \cdot e_f(R_{k,n})+e_c(R_k,n)+e_1(R_k,n) \tag{1}$$

$$x_2(R_k,n)=b \cdot e_f(R_k,n)+C(R_k) \cdot e_c(R_k,n)+e_2(R_k,n) \tag{2}$$

where a and b are complex constants, $e_f$ is the target signal, $e_c$ is a clutter signal and $e_1$ and, respectively $e_2$ are two mutually independent stochastic processes, one for each channel. Furthermore, $C(R_k)$ is a complex parameter which is determined by the geometry, i.e. the geometric relationship between the antennas included and the range bin $R_k$.

The resultant clutter-suppressed video signal is thus formed as follows:

$$\begin{aligned}\Psi(R_k,n)&=\hat{C}(R_k) \cdot x_1(R_k,n) \cdot x_2(R_k,n)= \\ &= (\hat{C}(R_k) \cdot a-b)e_f(R_k,n)+(\hat{C}(R_k)-C(R_k))e_c(R_k,n)+ \\ & \hat{C}(R_k)e_1(R_k,n)-e_2(R_k,n)\end{aligned} \tag{3}$$

where the parameter $C(R_k)$ has been estimated and the estimate is designated by $\hat{C}(R_k)$. The above equation shows that the clutter signal $e_c(R_k, n)$, is suppressed completely when the estimate $\hat{C}(R_k)$ is equal to the complex parameter $C(R_k)$.

The parameter $C(R_k)$ is distance-dependent and the distance-dependence can be modelled according to the following polynomial model $$C(R_k) = c_0 + c_1 \cdot R_k + \ldots + c_M \cdot R_k^m = \sum_{m=0}^{M} c_m \cdot R_k^m \tag{4}$$

This polynomial can also be written in the following vector form $$C(R_k)=\phi^T(R_k)\theta \tag{5}$$

where $$\phi^T(R_k)=[1, R_k, R_k^2, \ldots, R_k^M] \tag{6}$$

$$\theta^T=[c_0, c_1, c_2, \ldots, c_M]$$

where $\theta^T$ is a transpose. To estimate the coefficients in the polynomial, the following criterion function is used $$v(\theta, k) = \sum_{j \neq k} \sum_{n=1}^{N} |\phi^T(R_j)\theta \cdot x_1(R_j, n) - x_2(R_j, n)|^2 \tag{7}$$

Note that for the summation over the bins, the information from bin k will be left out, i.e. the criterion is calculated in an environment of bin k. An estimation of the parameter vector $C(R_k)$ is thus obtained by minimizing the criterion, see e.g. L. Ljung, T. Söderström, "Theory and Practice of Recursive Identification", Prentice Hall Inc., Englewood Cliffs, N.J., 1981. The solution is obtained by $$\hat{\theta}=P^{-1}r \tag{8}$$

where the matrix P and the vector r are calculated as follows $$P = \sum_{j \neq k} \phi(R_j)\phi^T(R_j)\sum_{n=1}^{N} x_1(R_j, n)x_1^*(R_j, n) \tag{9}$$

$$r = \sum_{j \neq k} \phi(R_j)\sum_{n=1}^{N} x_2(R_j, n)x_1^*(R_j, n) \tag{10}$$

An estimate of the parameter $C(R_k)$ is thus obtained by $$\hat{C}(R_k)=\phi^T(R_k)\hat{\theta} \tag{11}$$

which is used for suppressing the clutter signal.

From the above it can be noted that for the model order M equal to zero in the polynomial, the following degenerated polynomial is obtained $$C(R_k)=c_o \tag{12}$$

This polynomial provides the following vector $$\phi=1 \tag{13}$$

If the number of pulses N is chosen as 1, the estimate of the parameter $C(R_k)$ degenerates to $$\hat{C}(R_k) = \frac{\sum_{j \neq k} x_2(R_j)x_1^*(R_j)}{\sum_{j \neq k} x_1(R_j)x_1^*(R_j)} \tag{14}$$

By applying this estimate of the parameter $C(R_k)$, it can be seen that the result becomes equivalent to a so-called matched filter. This means that an estimate of the parameter $C(R_k)$ is a generalization of the so-called matched filter. A matched filter is known in connection with radar and is described e.g. in Robey, D. R. Fuhrmann, E. J. Kelly, R. Nitzberg, "A CFAR Adaptive Matched Filter Detector", IEEE Transactions on Aerospace and Electronic Systems, Vol. AES-28, No. 1, pp. 208-216, January 1992.

According to an example embodiment, the radar device comprises an antenna arrangement in the form of a monopulse antenna comprising two adjacent antennas which are above one another. One monopulse antenna comprises a system of antennas which can cooperate in transmitting a pulse and which cooperate in a known manner to receive a radar echo.

An arrangement comprising more than two antennas placed above one another is also possible within the scope of the technology. For example, it can be said that three antennas give rise to two degrees of freedom. One degree of freedom can be used for clutter suppression and the second degree of freedom can be used for more precisely calibrating the current altitude of the target. To simplify the description of the invention, two embodiments of the invention comprising two antennas are described below.

According to one example embodiment, the radar device comprises means for representing the video signal from the first antenna in the first channel and means for representing the video signal from the second antenna in the second channel. In the present embodiment, clutter components will thus occur in both channels according to the above description. As mentioned, the differences in magnitude between the clutter components are of such a type, that it is possible, by means of the estimation, to suppress the clutter components in the resultant video signals.

According to another example embodiment, the radar device comprises means for summing the signals from pairs of antennas included in the radar system in the second channel and means for forming the difference between the signals from pairs of antennas included in the radar system in the first channel. In this embodiment, the second channel will be called sum channel $\Sigma$ and the first channel difference channel $\Delta$, below.

The signals from the two adjacent antennas are transformed linearly into the sum signal $\Sigma$ and the difference signal $\Delta$. The signals x1 and x2 are exchangeable for any suitable linear combinations, e.g. sum and delta.

When the reflected pulses come back to the antennas, the analogue output signals are added to one another and subtracted from one another analogously in a known manner before they are converted into video signals. The added analogue output signals are converted to a video signal in a sum channel $\Sigma$. The subtracted analogue output signals are converted into a video signal in a difference channel $\Delta$. The sum channel provides the sum of the contributions of the different antennas for each bin and the difference channel provides the difference between the contributions of the two antennas for each bin. The sum channel represents a sum lobe in a resultant antenna pattern and the difference channel represents a difference lobe in a resultant antenna pattern. The present technology thus comprises a radar antenna with the possibility to instantaneously form at least two lobes in the form of, for example, a sum lobe and a difference lobe, in the vertical direction.

According to the present embodiment, the technology is characterized in that the clutter-suppressing means is arranged in such a manner that the clutter component $e_c$ for a certain bin $R_k$ is found in the sum channel $\Sigma$ multiplied by a complex constant $C(R_k)$, where the complex constant $C(R_k)$ is the quotient between the complex antenna gain of the sum channel and the difference channel in the direction of the ground for the current bin $R_k$. This clutter-suppressing means is arranged in such a manner that the clutter component $e_c$ for a certain bin $R_k$ is found in the difference channel $\Delta$. The clutter-suppressing means is arranged to estimate a complex constant $\hat{C}(R_k)$, which describes how the signals from the receiver antennas are weighted together separately for each bin $R_k$ in forming the resultant video signal $\Psi$. The estimated constant $\hat{C}(R_k)$ has the purpose of suppressing the clutter component $e_c$ in the resultant output video signal $\Psi$ in the sum channel $\Sigma$ via subtraction of the difference channel $\Delta$ multiplied by the estimated constant $\hat{C}(R_k)$. The clutter-suppressing means is arranged to create, by suppressing the clutter component, a zero position in the resultant antenna pattern of the resultant output video signal $\Psi$ in the direction of the current bin.

As mentioned earlier, the complex constant C between the sum channel (the second channel) and the difference channel (the first channel) is constant for each bin $R_k$.

The clutter component $e_c$ for certain bins $R_k$ is found by the sum channel $\Sigma$ multiplied by the complex constant C, where the complex constant C is the quotient between the complex antenna gain of the sum channel and the difference channel in the direction of the ground for the current bin $R_k$. As mentioned above, the complex constant is automatically adjusted in such a manner that the zero position is directed individually for each single bin towards the respective ground segment thereby suppressing the clutter signal.

As described above, the complex constant $\hat{C}(R_k)$ has been estimated by means of a polynomial of suitable degree "m" with suitable coefficients "$c_m$". The polynomial describes variations over a number of bins, centred around the current bin. The polynomial can be estimated on the basis of the magnitude of the bin and values from a suitable selection of bins located in the lobe.

To determine the complex constants, the method of least squares and a suitable polynomial of degree two are preferably used. The polynomial can certainly be of both higher and lower degree. When estimating the complex constants, it is preferably assumed that the energy in the ground clutter is much greater than the energy in the reflected pulse from the target, which is why the energy in the reflected pulse from the target can be disregarded in the estimation of the coefficients. If the energy in the reflected signal were to be much greater than the energy in the clutter, the problem with the clutter would be solved, since the target provides a strong and clear signal and clutter suppression would not be necessary.

The estimation of $C(R_k)$ according to equation 14 has a systematic variation with distance $R_k$.

In the resultant video output signal $\Psi(R_k)$ according to equation 3, the clutter component is suppressed for the current bin $R_k$. Clutter suppression can be illustrated in an antenna pattern for the resultant video signal $\Psi(R_k)$ (clutter suppression signal) through a resultant zero position. The present method creates an adaptive space filter where the resultant clutter-free signal $\Psi(R_k)$ can be used for subsequent filtering and/or detection. In addition, it can be used to directly form a detector according to GLRT or AMFD.

As mentioned above, it is possible, with the two antenna lobes, to "zero" out, i.e. suppress, the clutter in the direction of the ground for the current bin $R_k$. Also due to the fact that several antennas are placed above one another, several spatial degrees of freedom are produced which can be utilized for further improving the clutter suppression and/or for more precise calibration of the target for each single pulse.

In another example embodiment, the analogue output signals from each antenna are converted to video signals. Sum channels and difference channels are then formed by the first video signal and the second video signal being summed in a sum channel for each bin and by the first video signal being subtracted from the second video signal in a difference channel for each bin. The subtraction is intended for calculating the difference between the first video signal and the second video signal for each bin. After that, estimation of the complex constant/vector is performed in the same way as described in the case described above.

It applies to all embodiments that the antennas are allowed a certain amount of roll. A maximum rolling angle of the antennas of ±15° relative to the ground plane provides continuous good characteristics, but rolling angles exceeding ±15° can entail a certain impairment of performance with respect to the clutter suppression.

Where there are more than two antennas, the complex constant C will be represented by a vector C comprising components which give a relationship between different antenna pairs in the direction of the ground for a given bin $R_k$. Correspondingly, the estimated constant $\hat{C}$ will be represented by a vector $\hat{C}$.

In the case of more than two antennas, the antennas included in the radar are treated in pairs with one another. The summing and subtraction according to the above can be done either according to the analogue case or according to the digital case described above.

DESCRIPTION OF THE FIGURES

An example embodiment will be described by means of the figures shown in the drawings.

FIG. 8 diagrammatically shows both a vertical view and a horizontal view of an antenna pattern of the resultant lobes after clutter suppression according to the embodiment in FIG. 4 or 6.

PREFERRED EMBODIMENTS

Figure 1:
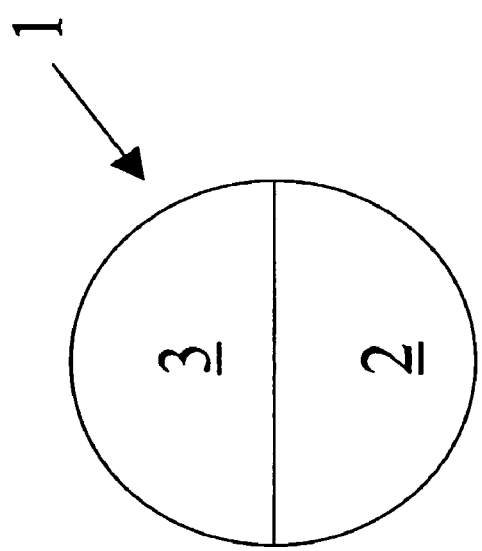
FIG. 1 diagrammatically shows a radar device according to the example embodiment comprising two antennas.

FIG. 1 diagrammatically shows a radar device 1 according to an example embodiment comprising two antennas 2, 3 placed above one another in the vertical direction. As mentioned in the description above, the radar device can comprise more antennas than two. In the figure, the radar device is shown to be round but the radar device can have other forms, e.g. oval, square or polygonal, the antennas included in the radar device being placed above one another.

Figure 2:
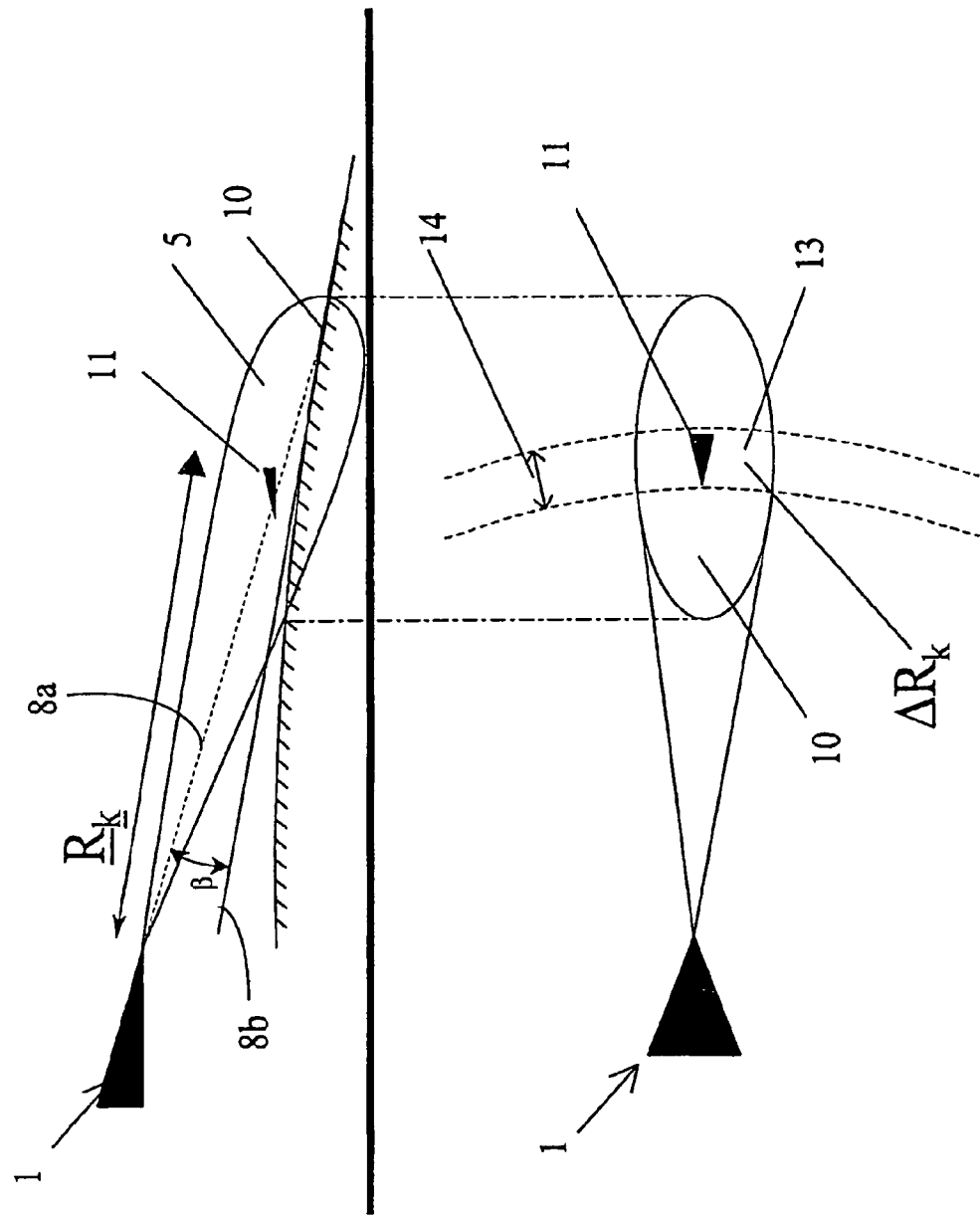
FIG. 2 diagrammatically shows both a vertical and a horizontal view of a radar device according to FIG. 1 which sends out a main lobe.

FIG. 2 diagrammatically shows both a vertical view and a horizontal view of a radar device according to FIG. 1 which sends out a main lobe 5 which illuminates a portion of ground 10 and a target 11.

The upper part of FIG. 2 shows the vertical view of the main lobe 5 and a bin $R_k$ located in the line of sight 8a from the radar device 1. The line of sight 8a is the direction in which the radar device sends out its main lobe, i.e. the direction in which the main proportion of the energy of the pulse sent out is directed. In the vertical view, the bin $R_k$ corresponds to a distance from the radar device 1 to a certain point along the line of site 8a. The distance (bin) depends on the choice of the instant of sampling and the sampling time selected.

The lower part of FIG. 2 shows the horizontal view of the main lobe 5. In the horizontal view, the bin $R_k$ is represented by a ground segment 13 on the illuminated portion of ground 10. In FIG. 2, the ground segment 13 is shown as a curved strip with a certain width 14. The ground segment 13 is a projection of the bin $R_k$ on the portion of ground 10 which is why the width 14 of the ground segment 13 depends on the sampling time and the angle $\beta$. The angle $\beta$ is the angle between the line of site 8a of the radar device and a tangent 8b to the ground plane 10. The tangent 8b to the ground plane is taken at the point where the line of site 8a intersects the ground plane 10. The sampling time gives rise to a distance $\Delta R_k$ which, depending on the angle $\beta$, is projected on the illuminated portion of ground 10 according to $\Delta R_k/\cos(\beta)$, which gives rise to the width 14 of the ground segment 13.

In FIG. 2, a bin $R_k$ is shown which includes the target 11 which is located at a distance from the ground.

Figure 3:
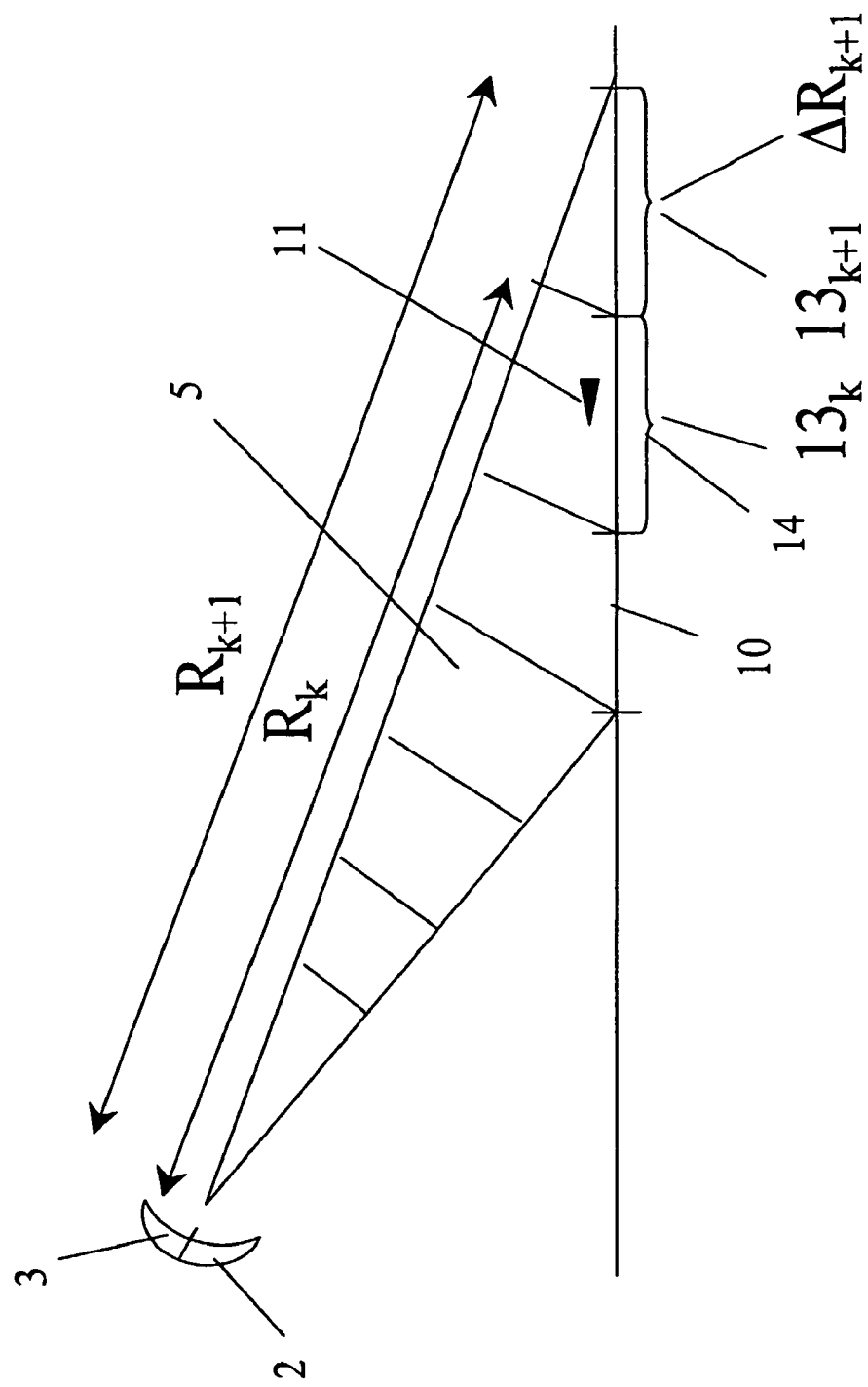
FIG. 3 diagrammatically shows a radar device according to FIG. 1 seen from the side, where the main lobe is described as divided into segments due to sampling.

FIG. 3 diagrammatically shows a radar device according to FIG. 1 seen from the side, where the main lobe 5 is described as divided into segments/bins due to sampling. FIG. 3 shows a number of bins (bins $R_k$ and $R_{k+1}$ are marked in the figure) with corresponding ground segments $13_k$ ($\Delta R_k$) and $13_{k+1}$ ($\Delta R_{k+1}$) with a certain width 14. FIG. 3 is intended to illustrate how the reflected pulses, due to sampling, can be interpreted as the main lobe 5 being divided into a number of bins. FIG. 3 also shows the target 11 in bin $R_k$.

Figure 4:
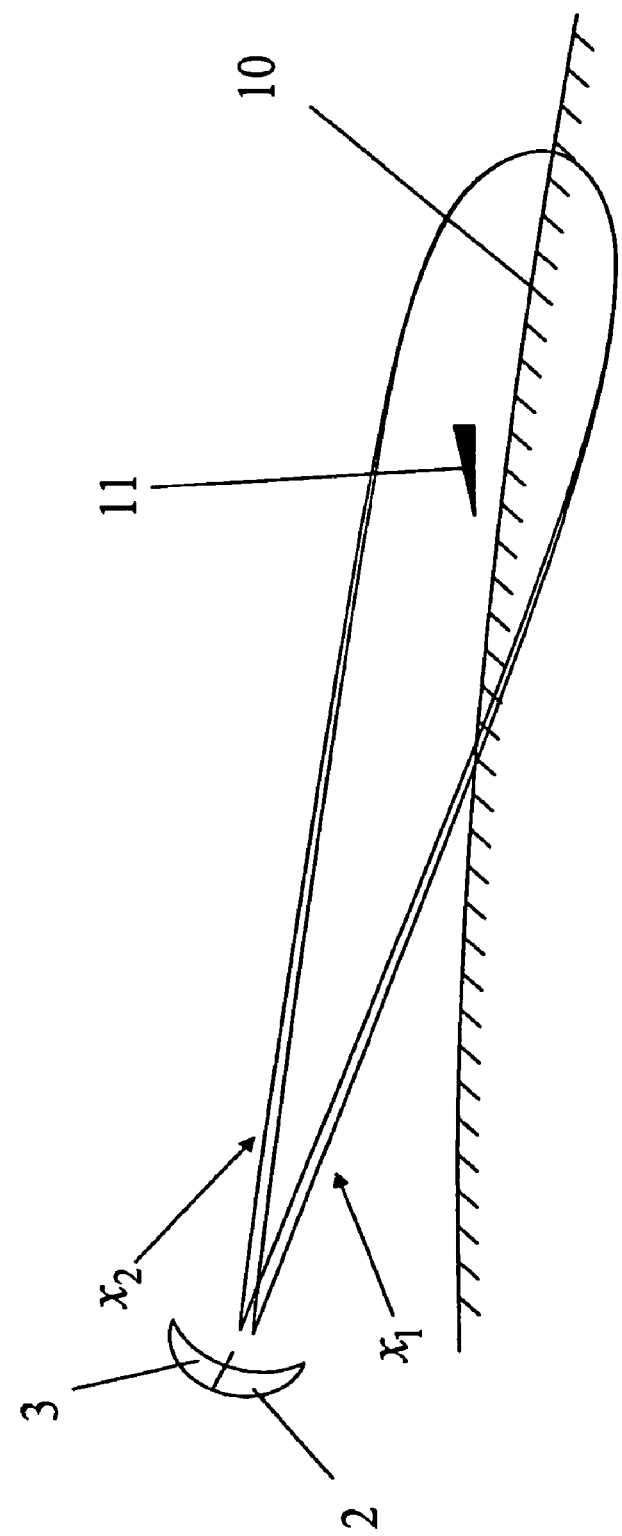
FIG. 4 diagrammatically shows an antenna pattern for a radar device according to FIG. 1 according to an example embodiment.

FIG. 4 diagrammatically shows an antenna pattern for a radar device according to FIG. 1. FIG. 4 shows a first lobe which is marked by $x_1$ which corresponds to the signal which is received by the first antenna 2. FIG. 4 also shows a second lobe which is marked by $x_2$, which corresponds to the signal which is received by the second antenna 3. FIG. 4 also shows a target 11 at a certain distance from the ground 10. Both lobes $x_1$ and $x_2$ are directed towards the ground 10 and the target 11. It is shown in the figure that the second lobe $x_2$ comes from a position which is vertically higher than the first lobe $x_1$. This is due to the fact that the two receiving antennas 2, 3 are placed above one another. Otherwise, the two lobes have the same extent and the same appearance.

Figure 5:
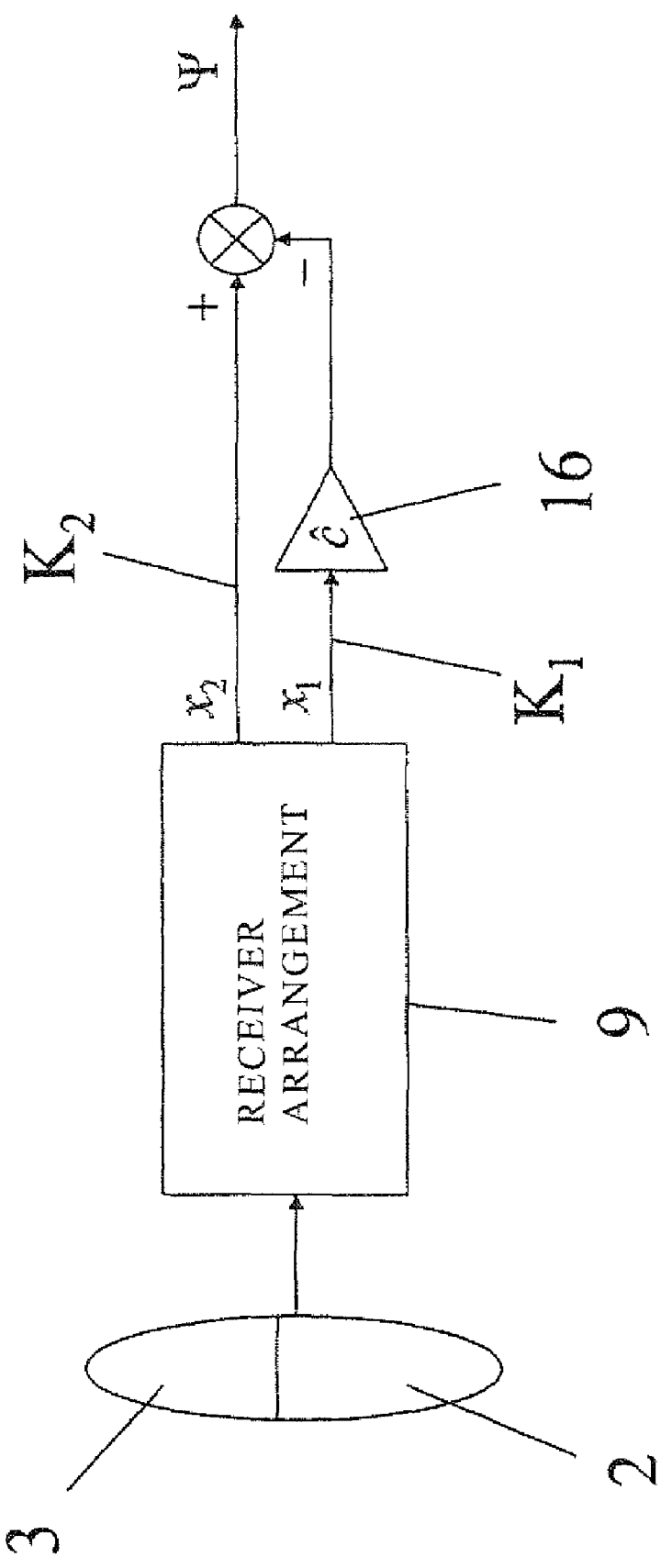
FIG. 5 diagrammatically shows a block diagram of the process of clutter suppression according to the embodiment in FIG. 4.

FIG. 5 diagrammatically shows a block diagram of the process for clutter suppression according to the embodiment in FIG. 4. The figure shows a radar device 1 comprising two antennas 2, 3. The device also comprises a receiver arrangement 9 which processes the signals from the antennas 2, 3. The receivers 9 can contain means for converting analogue signals into digital signals. The signals $x_1$ and $x_2$ are signals from the two antennas 2, 3 and FIG. 5 indicates that the signals are represented by a first channel $K_1$ and a second channel $K_2$.

A method for performing clutter suppression will be described below, using the designations specified in FIG. 5.

The signals for range bin $R_k$, and pulse or Doppler channel n, are described as follows $$x_1(R_k,n) = a \cdot e_f(R_k,n) + e_c(R_k,n) + e_1(R_k,n) \quad (1)$$

$$x_2(R_k,n) = b \cdot e_f(R_k,n) + C(R_k) \cdot e_c(R_k,n) + e_2(R_k,n) \quad (2)$$

where a and b are complex constants, $e_f$ is the target signal, $e_c$ is a clutter signal and $e_1$ and, respectively $e_2$ are two mutually independent stochastic processes, one for each channel. Furthermore, $C(R_k)$ is a complex parameter which is determined by the geometry, i.e. the geometric relationship between the antennas included and the range bin $R_k$.

The resultant clutter-suppressed video signal is thus formed as follows:

$$\Psi(R_k,n) = \hat{C}(R_k) \cdot x_1(R_k,n) - x_2(R_k,n) = (\hat{C}(R_k) \cdot a - b)e_f(R_k,n) + (\hat{C}(R_k) - C(R_k))e_c(R_k,n) + \hat{C}(R_k)e_1(R_k,n) - e_2(R_k,n) \quad (3)$$

where the parameter $C(R_k)$ has been estimated and the estimate is designated by $\hat{C}(R_k)$. The above equation shows that the clutter signal $e_c(R_k,n)$, is suppressed completely when the estimate $\hat{C}(R_k)$ is equal to the complex parameter $C(R_k)$.

The signals x1 and x2 are exchangeable for any suitable linear combinations, e.g. sum and delta.

Figure 6:
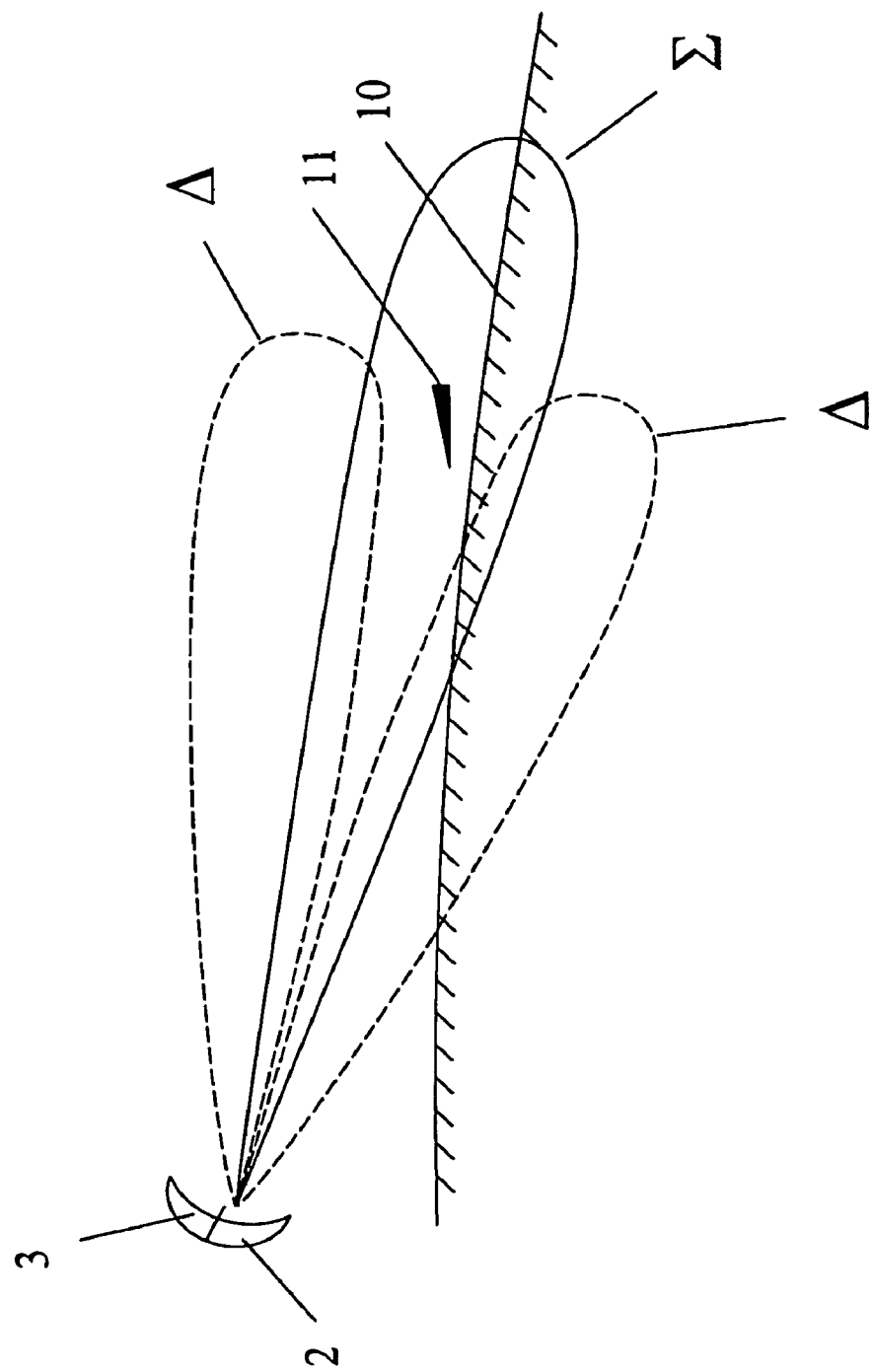
FIG. 6 diagrammatically shows an antenna pattern of difference lobe $\Delta$ and sum lobe $\Sigma$ for a certain bin $R_k$ according to an example embodiment.

FIG. 6 diagrammatically shows an antenna pattern of a difference lobe $\Delta$ and sum lobe $\Sigma$ for a certain bin $R_k$. FIG. 6 shows an example embodiment where the signals $x_1$ and $x_2$ from the antennas are linearly combined in such a manner that a difference channel Δ and a sum channel Σ are formed. When the antennas receive reflections from the emitted pulses, the pulses are converted into output signals in the radar system. The output signals are added together in a sum channel Σ and subtracted in a difference channel Δ. The difference lobes Δ are a representation of the difference channel Δ and the sum lobe Σ is a representation of the sum channel Σ.

FIG. 6 shows the target 11 in the sum lobe Σ. According to example embodiments, the clutter component $e_c$ for a certain bin $R_k$ is located in the sum channel Σ multiplied by the complex constant C, where the complex constant C is the quotient between the complex antenna gain of the sum channel and of the difference channel in the direction of the ground for the current bin $R_k$. In the sum channel Σ, the target is also represented by a target signal $e_t$.

FIG. 6 shows that the target 11 is located between the two difference lobes Δ, which is why the target 11 will not have a target signal in the difference channel Δ. The figure shows that the lower one of the two difference lobes "illuminates" a ground section, i.e. provides a contribution in the form of ground clutter $e_c$ in the difference channel Δ. This signal is used for suppressing the clutter component $Ce_c$ in the sum channel, which also works for target positions which give rise to a target signal in the difference channel.

Figure 7:
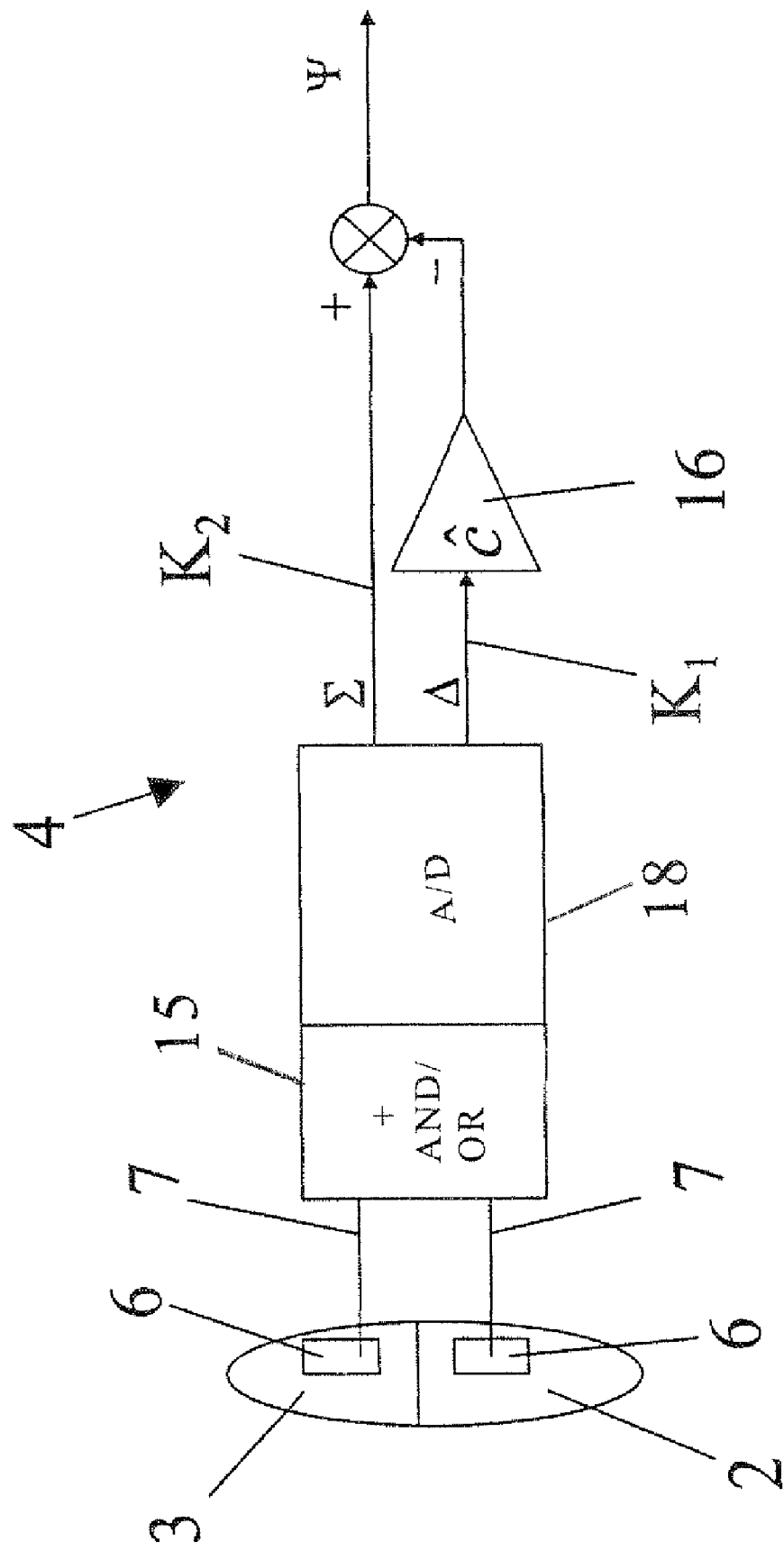
FIG. 7 diagrammatically shows a block diagram of the process of clutter suppression according to the embodiment in FIG. 6.

FIG. 7 diagrammatically shows means 4 for clutter suppression of the radar device 1 and a block diagram of the process in clutter suppression, where the linear combination according to FIG. 6 is used. The radar device 1 sends out a pulse via the antennas 2, 3 in a time interval $t_1$, whereafter there is an interruption in the sending out in a time interval $t_2$. In time interval $t_2$, the receiver antennas 2, 3 receive reflected signals from the pulse sent out.

The received pulses are converted into analogue output signals 7 in the clutter-suppressing means 4 via a radar receiver 6. The radar receiver can be any suitable means for converting received radar pulses into analogue output signals.

FIG. 7 also shows that the means 4 for clutter suppression comprises means 15 for summing and/or subtracting the analogue output signals 7 from the receiver antennas 2, 3 included in the radar system 1. The means 15 for summing and/or subtracting the analogue output signals 7 can be formed by any suitable system for analogue signal processing.

The means 4 for clutter suppression also comprises means 18 for converting the analogue output signals 7 into digital signals (A/D conversion), video signals. In the embodiment shown in FIG. 5, A/D conversion is performed after the analogue signals have been summed and subtracted. During A/D conversion, the analogue signals are sampled. As mentioned above, the sampling time is decisive for the appearance of the bins, i.e. how much information each bin can contain with respect to reflected pulses. The sampling time is thus decisive for the size of the bins and must be a fraction of the time interval $t_2$. The time interval is so small, that the speed of the target and the radar arrangement, respectively, is negligible with respect to the problem set, i.e. that the problem can be considered as being static for a pulse.

The summed signals are presented in a sum channel Σ and the subtracted signals are presented in a difference channel Δ. When comparing the embodiment described in FIG. 5 and the embodiment in FIG. 7, it can be seen that the first channel $K_1$ in FIG. 7 corresponds to the difference channel Δ and that the second channel $K_2$ corresponds to the sum channel Σ. FIG. 7 shows means 16 for estimating the complex constant Ĉ. Such a means 16 for estimating the complex constant Ĉ can be any suitable arrangement with the capability of performing algebraic operations in signal processing, e.g. a computer or a circuit or the like. Such an arrangement must also have the capability of performing the algebraic operations necessary for estimating the complex constant Ĉ.

In FIG. 7, it is shown with known symbols that the estimated complex constant Ĉ is multiplied by the difference channel Δ, whereafter the difference channel Δ multiplied by the estimated complex constant Ĉ is subtracted from the sum channel Σ, which gives rise to the resultant video output signal Ψ. The algebraic operation is performed as above with an arrangement suitable for the purpose.

The factor which distinguishes the clutter component $e_c$ in the sum channel Σ from the clutter component $e_c$ in the difference channel Δ is thus the complex constant C. As mentioned, the complex constant C is constant for a given bin $R_k$, which is why it is possible to estimate a complex constant Ĉ for each bin for each pulse. If the estimated complex constant Ĉ is equal to the complex constant C, the clutter component $e_c$ in the sum channel Σ can be eliminated by multiplying the estimated complex constant Ĉ by the difference channel Δ, whereafter the difference channel Δ multiplied by the estimated complex constant Ĉ is subtracted from the sum channel Σ.

Equations (1), (2) and (3) apply to the embodiment with the sum channel Σ and delta channel Δ, where x1 is exchanged for Δ and x2 is exchanged for Σ.

FIG. 8 diagrammatically shows both a vertical view and a horizontal view of an antenna pattern of the resultant lobe for the resultant video output signal Ψ after clutter suppression according to any of the embodiments shown in FIGS. 4 and 6. FIG. 8 clearly shows how the clutter is suppressed and that the antenna pattern illustrates the suppression as a zero position 17 in the resultant antenna pattern for the resultant video output signal Ψ. In this way, the signal contribution of the target stands out in the resultant video output signal Ψ in a manner which enables further analysis to be performed.

The invention is not limited to what has been shown in the above embodiment but can vary within the scope of the patent claims. As mentioned above in the description of the invention, the radar device can comprise more than two antennas. Moreover in another embodiment of the invention according to FIG. 6, the A/D conversion can be performed before the summing and subtraction of the signals.

The invention claimed is:

1. An airborne radar device comprising:
   at least two antennas;
   wherein the radar device is arranged to send out, via the antennas, radar pulses focused in main lobes;
   wherein the antennas are arranged to receive reflected radar pulses, the antennas being separated from each other vertically;
   means for transforming the received radar pulses into signals in the form of sequences of bins (Rk), the signals being carried in a first channel ($K_1$) and a second channel ($K_2$);
   clutter-suppressing means arranged in such a way that a clutter component ($e_c$) of a certain bin ($R_k$) in the first channel ($K_1$) is also found in the second channel ($K_2$) multiplied by a complex constant ($C(R_k)$), where the complex constant ($C(R_k)$) is a quotient between complex antenna gain of the second channel ($K_2$) and of the first channel in a direction of ground for the current bin ($R_k$), the clutter-suppressing means being arranged to estimate a complex constant ($\hat{C}(R_k)$) which describes how the signals from the receiver antennas are weighted together separately for each bin ($R_k$) when the resultant output signal (Ψ) is formed, the estimated constant ($\hat{C}(R_k)$) serving to suppress the clutter component ($e_c$) in the resultant output signal ($\Psi$) by subtraction of the second channel ($K_2$) from the first channel ($K_1$) multiplied by the estimated constant ($\hat{C}(R_k)$).

2. A radar device according to claim 1, wherein the radar device comprises means for putting the signal from the first antenna in the first channel ($K_1$) and means for putting the signal from the second antenna in the second channel ($K_2$).

3. A radar device according to claim 1, further comprising means for summing the signals from pairs of antennas included in the radar system in the second channel ($K_2$) and means for forming a difference between the signals from pairs of antennas included in the radar system in the first channel ($K_1$).

4. Radar device according to claim 1, wherein the clutter-suppressing means is arranged for estimating the complex constant ($\hat{C}(R_k)$) by utilizing the values from range bins in the vicinity of the current range bin ($R_k$).

5. A radar device according to claim 1, wherein the clutter-suppressing means is arranged for estimating the complex constant ($\hat{C}(R_k)$) by adapting a polynomial of degree "m" with coefficients "$c_m$", wherein the polynomial describes variations over a number of bins centered around the current bin.

6. A radar device according to claim 5, wherein the clutter-suppressing means is arranged for determining the coefficients of the polynomial by means of the method of least squares.

7. A radar device according to claim 1, wherein in that the clutter-suppressing means is arranged for suppressing clutter without coherence between different pulses sent out.

8. A radar device according to claim 1, wherein the antennas are rolled by ±15° maximum relative to the ground plane.

9. A method for suppressing ground clutter comprising:
jointly sending out a focused radar pulse in the form of a main lobe from at least two antennas separated from each other vertically,
receiving reflected radar pulses by the antennas,
converting the received radar pulses into signals in the form of a number of bins ($R_k$), the signals being carried in a first channel ($K_1$) and a second channel ($K_2$),
transmitting a clutter component ($e_c$) multiplied by a complex constant ($C(Rk)$) for a certain bin ($R_k$) in the second channel ($K_2$), where the complex constant ($C(Rk)$) is a quotient between the second channel ($K_2$) and the complex antenna gain of the first channel ($K_1$) in a direction of the ground for the current bin ($R_k$),
transmitting the clutter component ($e_c$) for a certain bin ($R_k$) in the first channel ($K_1$),
estimating a complex constant ($\hat{C}(R_k)$) by weighting together the signals from the antennas separately for each bin ($R_k$) when forming a resultant output signal ($\Psi$),
multiplying the estimated constant ($\hat{C}(Rk)$) by the first channel ($K_1$),
in the resultant output signal ($\Psi$), subtracting the second channel ($K_2$) from the first channel ($K_1$) multiplied by the estimated constant ($\hat{C}(Rk)$), which gives rise to the clutter component ($e_c$) being suppressed in the resultant output signal ($\Psi$).

10. The method according to claim 9, wherein the method puts the signal from the first antenna in the first channel ($K_1$) and the signal from the second antenna in the second channel ($K_2$).

11. The method according to claim 9, further comprising summing of the signals from pairs of antennas included in the radar system in the second channel ($K_2$) and subtracting the signals from antenna pairs included in the radar system in the first channel ($K_1$).

12. The method according to claim 9, wherein the step of estimating the estimated constant ($\hat{C}(Rk)$) comprises the following acts:
selecting a polynomial of degree M with a number of complex constants ($c_m$),
estimating the complex constants ($c_m$) by the method of least squares and the values from a number of bins in the main lobe, which polynomial has the following appearance:

$$\hat{C}(R_k) = \sum_{0}^{M} c_m R_k^m$$

13. The method according to claim 9, wherein the method suppresses clutter independently of the coherence between the pulses.

14. The method according to claim 9, further comprising sending out and receiving of pulses from antennas which are rolled by ±15° maximum relative to the ground plane.

15. The method according to claim 9, further comprising sending out and receiving of pulses from a radar device which is airborne.

* * * * *